United States Patent [19]

Kato et al.

[11] Patent Number: 4,525,662
[45] Date of Patent: Jun. 25, 1985

[54] BATTERY CHARGING CONTROL SYSTEM FOR AUTOMOBILE

[75] Inventors: Hidetoshi Kato, Anjo; Takeshi Sada; Nobuo Mayumi, both of Oobu; Hajime Matsuhashi, Kariya, all of Japan

[73] Assignee: Nippondenso Co., Ltd., Kariya, Japan

[21] Appl. No.: 554,390

[22] Filed: Nov. 22, 1983

[30] Foreign Application Priority Data

Nov. 26, 1982 [JP] Japan .................... 57-207897

[51] Int. Cl.³ .................... H02J 7/14; H02P 9/30
[52] U.S. Cl. .................... 322/28; 320/64; 322/29; 322/58; 322/73
[58] Field of Search .................... 322/28, 58, 73, 29; 320/64, 68, 61

[56] References Cited

U.S. PATENT DOCUMENTS

| | | | |
|---|---|---|---|
| 4,128,799 | 12/1978 | Morishima | 320/64 X |
| 4,340,849 | 7/1982 | Kuhn | 322/58 X |
| 4,368,417 | 1/1983 | Matsuyama | 322/29 |

Primary Examiner—R. J. Hickey
Attorney, Agent, or Firm—Cushman, Darby & Cushman

[57] ABSTRACT

A battery charging control system for automobile, wherein a voltage regulator for regulating the output voltage of an AC generator for charging the automobile battery is controlled by detecting changes of the output voltage. When the output voltage of the generator changing with ripples is reduced with an increase of load current, the minimum value of the output voltage is detected, while when the output voltage increases with an increase of the generator rotational speed, an average value of the output voltage is detected. In accordance with these values, the voltage regulator is controlled to compensate for the changes of the output voltage of the generator.

8 Claims, 6 Drawing Figures

BATTERY CHARGING CONTROL SYSTEM FOR AUTOMOBILE

BACKGROUND OF THE INVENTION

The present invention relates to a charging control system for automobiles, which is capable of superior control of the charging of the battery thereof.

In conventional systems, the output voltage of an AC generator is generally controlled to a fixed level for charging of the battery. These systems, however, have the disadvantage that a voltage drop occurs due to the wiring resistance between the generator and the battery, especially when the load current is increased by the operation of an electrical load, with the result that the voltage applied to the battery terminals is reduced below a predetermined value, thus often leading to the shortage of charge.

According to a conventional method of ovbiating this shortcoming, as disclosed in Japanese Patent Publication No. 55-13503, the upward trend of the load current is detected from peak value or ripple variation of the voltage at the neutral point of the generator, so that when the average value of this variation increases beyond a predetermined value, the regulation voltage is increased to compensate for the drop of the battery voltage caused by the increase of the load current.

In this case, however, the regulation voltage is changed only between two fixed high and low levels and yet is controlled in accordance with the average value of the voltage variation, thereby failing to compensate fully for the voltage drop across the battery.

SUMMARY OF THE INVENTION

Accordingly, the object of the present invention is to provide a battery charging control system for automobile, in which the voltage drop across the battery is effectively compensated for to maintain an optimum charging condition of the battery when the load current increases.

According to the present invention, there is provided an automobile battery charge control system for controlling the output voltage of an AC generator by a voltage regulator thereby to charge a battery, comprising detector means for detecting a minimum value or an average value of the output voltage changing with ripples, and regulation voltage changing means for producing a regulation voltage smaller than the average value of the output voltage of the AC generator in response to the output voltage of the detector means and applying the regulation voltage to the voltage regulator.

DESCRIPTION OF THE PREFERRED EMBODIMENTS

Figure 1:
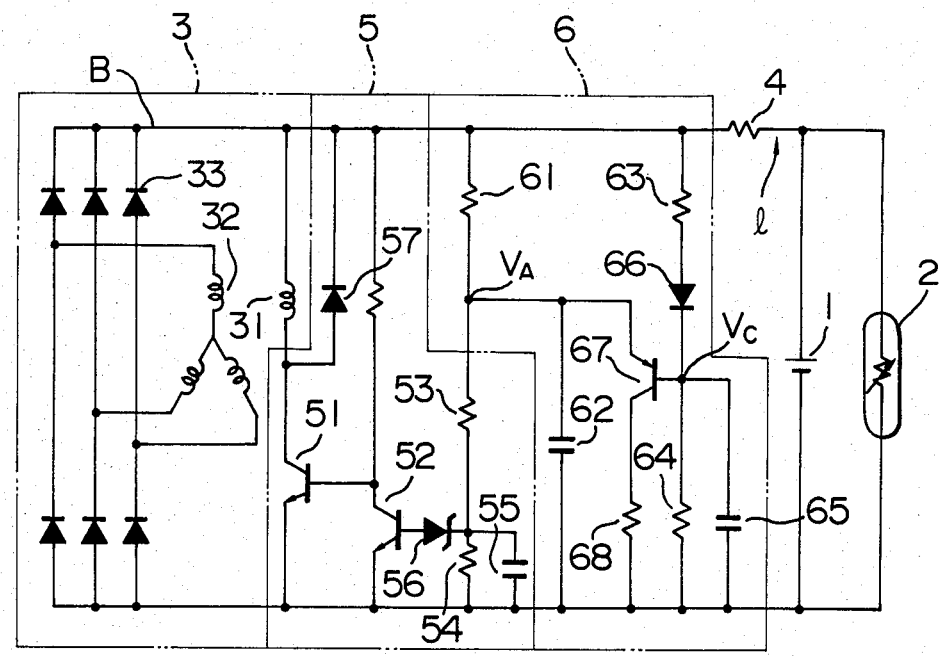
FIG. 1 is a circuit diagram showing an embodiment of the present invention.

An embodiment of the present invention will be described below with reference to the drawings. Reference numeral 1 designates a battery mounted in an automobile, numeral 2 an automobile electrical load such as a head lamp or a fan motor, and numeral 3 an automobile-engine driven generator of three-phase AC type including a field coil 31, an armature coil 32 and three-phase fullwave rectifying diodes 33. The rectified output of this generator is used to charge the battery 1 on the one hand and to supply current to the external electrical load 2 on the other hand. Numeral 4 designates an equivalent wire resistance (generally of several mΩ) of output line 1 between the generator 3 and the battery 1. Numeral 5 designates a voltage regulator including an output transistor 51, a control transistor 52, voltage-dividing resistors 53, 54, an input voltage-smoothing capacitor 55, a zener diode 56 and a diode 57 for absorbing a reverse electromotive force. This voltage regulator 5 is for detecting the output voltage of the generator to control the excitation field current to maintain the output voltage of the generator at a set value. Numeral 6 designates a control circuit for detecting ripple variations in the output voltage of the generator and changing the regulation voltage of the voltage regulator 5 accordingly. This circuit 6 includes a first integrator circuit having a resistor 61 and a capacitor 62, a second integrator circuit having resistors 63, 64, a capacitor 65 and a diode 66, and a discharge circuit having a transistor 67 and a resistor 68. The time constant of the first integrator circuit is set higher than that of the second integrator circuit.

Figure 2:
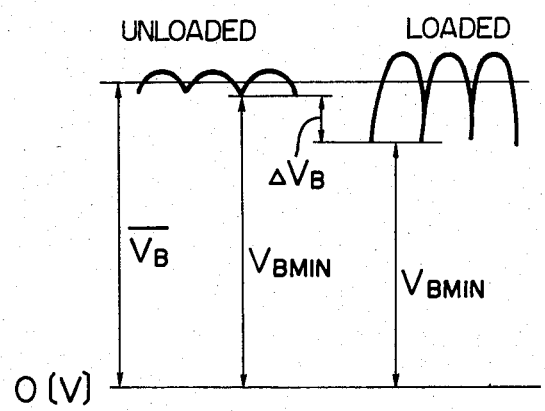
FIG. 2 shows waveforms of an output voltage.
Figure 3:
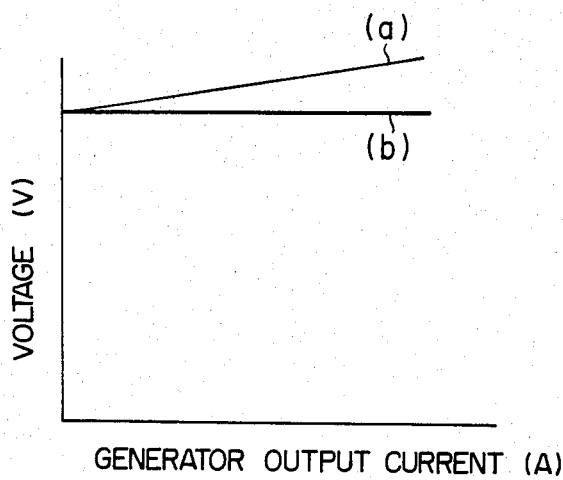
FIG. 3 is a diagram showing an output voltage control characteristic against the output current of the generator.

The operation of the above-mentioned configuration will be explained below. The ripple variation of the generator output voltage is larger under a load (with an increased load current) than under no load as shown in FIG. 2. In view of this fact, according to the present invention, the minimum value $V_{BMIN}$ of the output voltage $V_B$ containing ripples or a value lower than the average value $\overline{V}_B$ is introduced to the voltage regulator 5, so that as shown by the characteristic (a) in FIG. 3, the output current of the generator (namely, the load current and charging current) is increased while at the same time increasing the generation voltage. In this way, the voltage drop across the wire resistance is compensated for thereby to maintain substantially constant the voltage applied to the battery terminals as shown by the characteristic (b) in FIG. 3.

The above-mentioned process will be explained with reference to FIG. 1. The transistor 67 conducts when the terminal voltage $V_C$ of the capacitor 65 drops below the terminal voltage $V_A$ of the capacitor 62. The charges of the capacitor 62 are thus discharged through the resistor 68, and the voltage $V_A$ at the end of this discharge is regulated substantially at a voltage value proportional to the minimum value $V_{BMIN}$ of the ripples of the output voltage $V_B$ of the generator. (FIG. 4).

Figure 4:
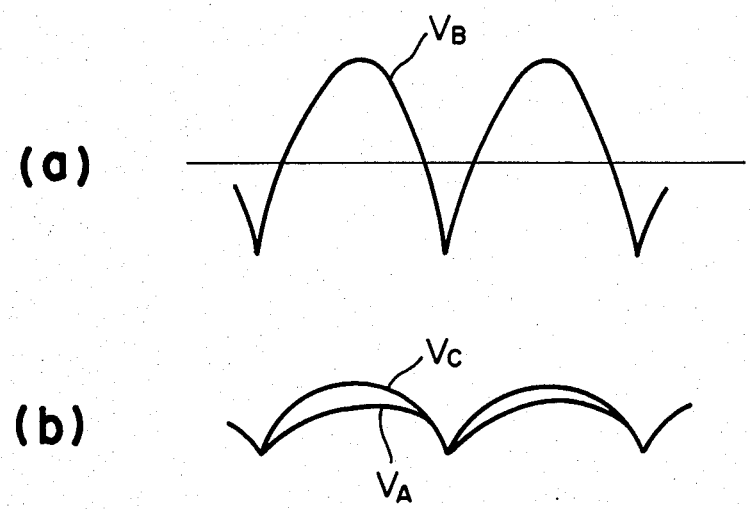
FIG. 4 shows waveforms for explaining the operation of the present invention.

In other words, the charges in the capacitor 65 are discharged through the resistor 64, and therefore, with an increase of ripple variations and hence with a decrease of the output voltage $V_B$ or $V_C$, the voltage $V_A$ becomes securely higher than voltage $V_C$ as shown in (b) of FIG. 4, on account that the time constant of the first integrator circuit is larger than that of the second integrator circuit as described above. As a result, the voltage proportional to the voltage $V_{BMIN}$ is applied to the voltage regulator 5, so that the transistor 52 is turned off while the transistor 51 is turned on, thus increasing the generated voltage by way of compensation.

Figure 5:
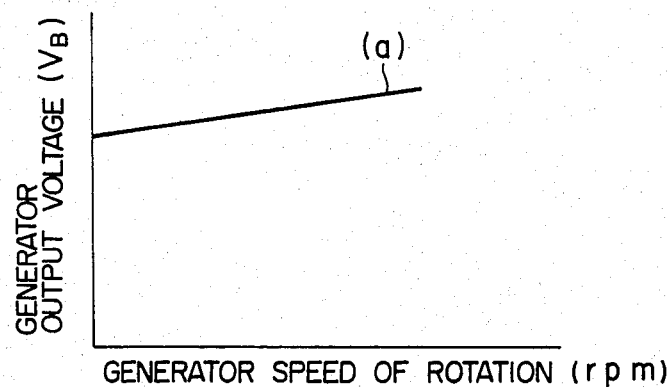
FIG. 5 is a diagram showing a change of the output voltage according to the rotational speed of the generator.

The ripple level of the generator, as shown in FIG. 2, is proportional both to the output current of the generator (i.e., magnitude of the electrical load) and to the rotational speed of the generator (i.e., a value proportional to the engine speed). If the output voltage of the generator is regulated always by detection of the minimum value of ripples, therefore, the output voltage changes with the rotational speed of as shown by the characteristic (a) in FIG. 5, with the result that the output voltage of the generator increases so much as to cause overcharge of the battery at high speeds of rotation. The second integrator circuit is inserted for the purpose of minimizing the effect of this high speed of rotation.

Specifically, when the rotational speed of the generator exceeds a set level, the ripple frequency of the output voltage also increases. If the charging time constant due to the resistor 63 and the capacitor 65 is set at a level smaller than the discharging time constant due to the resistor 64 and the capacitor 65, the electrons charged to the capacitor 65 when the ripple voltage increases fail to discharge when the ripple voltage drops. Consequently, the minimum value of the voltage $V_C$ is higher than the minimum value of the ripples, thereby reducing the chance of conduction of the transistor 67. The terminal voltage $V_A$ of the capacitor 62 is thus restored gradually from a value lower than the average of the output voltage of the generator to a value equal to the average value, so that the regulated value of the output voltage is prevented from increasing with an increase of the engine speed.

Figure 6:
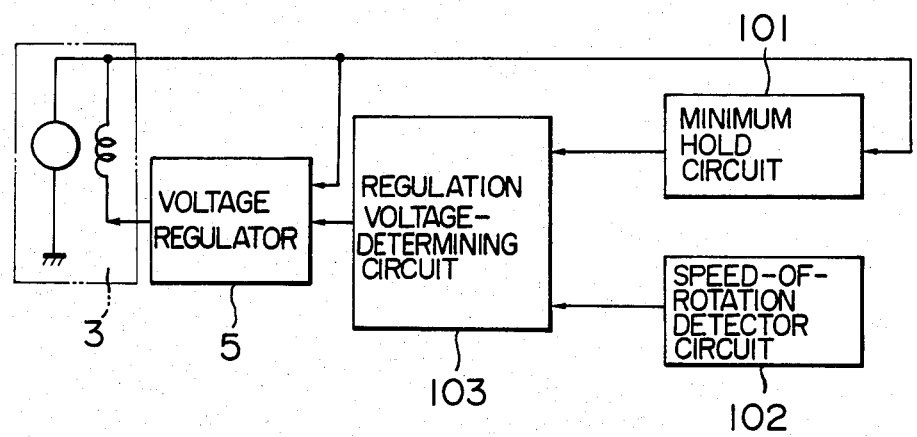
FIG. 6 is a block diagram showing another embodiment of the present invention.

Another embodiment of the present invention is shown in FIG. 6. According to this embodiment, the minimum value $V_{BMIN}$ of the output voltage $V_B$ of the generator containing ripples is sampled and held, and the variation of the minimum value due to rotational speed variation of the generator is compensated thus determining a regulation voltage for producing an output voltage $V_B$ most suitable for the present output current of the generator. The voltage thus determined is applied to the voltage regulaor. In this way, the voltage drop across the battery which otherwise might occur with an increase of the output current is prevented without fail to assure a stable charging control. In FIG. 6, numeral 101 designates a minimum hold circuit for sampling and holding the minimum value $V_{BMIN}$ of the output voltage $V_B$, numeral 102 a circuit for detecting the rotational speed of the generator, and numeral 103 a regulation voltage-determining circuit for determining an optimum regulation voltage from the minimum value $V_{BMIN}$ and the present rotational speed of the generator. This regulation voltage-determining circuit may include a map for storing an optimum regulation voltage with the generator speed of rotation and the voltage $V_{BMIN}$ as parameters.

It will be understood from the foregoing description that according to the present invention, when the output current of the geneator is increased the output voltage of the generator is controlled at a high value in accordance with the ripple variation in the output voltage, so that the drop of the battery voltage caused by the wire resistance is effectively compensated, thus maintaining the battery in the optimum condition.

We claim:

1. A charging control system for an AC generator of an automobile for charging a battery, comprising:
    means for detecting minimum value of the charging voltage when the generator charging voltage decreases and for detecting average value of the charging voltage when the generator charging voltage increases; and
    means for regulating excitation input of said generator in accordance with the detected values in order to compensate for the changes of said charging voltage.

2. A system according to claim 1, wherein said detecting means includes a first charge-discharge circuit connected in parallel with said generator and having a first time constant, switch means for controlling the charge and discharge operation of said circuit, a second charge-discharge circuit having a second time constant smaller than said first time constant and connected in parallel with said generator for effecting on-off control of said switch means.

3. A system according to claim 2, wherein said second charge-discharge circuit includes a charge circuit having a charge time constant and connected in parallel with said generator, and a discharge circuit having a discharge time constant larger than said charge time constant.

4. A system according to claim 2, wherein said first charge-discharge circuit comprises a first capacitor and a first discharge resistor, said second charge-discharge circuit comprises a parallel circuit of a second capacitor and a second discharge resistor connected through a diode to said generator, and said switch means comprises a transistor having a collector-emitter path connecting said first capacitor and said first discharge resistor and having a base connected to connecting point of said parallel circuit and said diode.

5. A control system for an AC generator of an automobile, comprising:
    means for detecting minimum value of the output voltage of said generator changing with ripples when said output voltage decreases and for detecting average value of the output voltage of said generator when said output voltage increases, said detector means producing a regulation voltage lower than said detected values; and
    means for regulating excitation input of said generator in accordance with the regulation voltage in order to compensate for the changes of the output voltage of said generator.

6. A charging control system for an AC generator of an automobile for charging a battery, comprising:
    an AC generator having an output winding, a field winding, full-wave rectifying means connected to said output winding, and an output terminal connected to said rectifying means;
    a voltage regulator circuit having an output transistor connected to said field winding, and a voltage divider, a juncture of which is operatively connected to a base of said output transistor so that said output transistor becomes conductive and non-conductive in response to a voltage appearing at said juncture;
    an integrator circuit having a series connection of a resistor and a capacitor and connected to said output terminal of said AC generator, said voltage divider being connected to a juncture between said resistor and said capacitor of said integrator circuit;
    a second voltage divider connected to said output terminal of said AC generator; and a discharge circuit including a resistor and PNP transistor having a base, emitter and collector, said base of said PNP transistor being connected to a juncture of said second voltage divider, and emitter of said PNP transistor being connected to said juncture of said integrator circuit and said collector of said PNP transistor being connected to said resistor of said discharge circuit, so that when a voltage at said juncture of said integrator circuit becomes higher than that at said juncture of said second voltage divider, said PNP transistor becomes conductive so as to discharge the charge on said capacitor through said discharge circuit with the result that the voltage appearing at said juncture of said integrator circuit is decreased.

7. A charging control system according to claim 6, further comprising a capacitor connected across said base and collector of said PNP transistor to form a second integrator circuit with said second voltage divider a time constant of which is smaller than that of the first-mentioned integrator circuit.

8. A charging control system for an AC generator of an automobile for charging a battery, comprising:

a voltage regulator circuit having an output transistor connected to a field winding of an AC generator and having a voltage divider, said output transistor being operatively connected to said voltage divider for responding to a voltage appearing at a juncture of said voltage divider;

a first integrator circuit having a series connection of a resistor and a capacitor and connected to an output terminal of said AC generator, said voltage divider being connected to a juncture between said resistor and said capacitor;

a second integrator circuit having a series connection of a resistor and a capacitor and connected to said output terminal of said AC generator;

a discharge circuit including a resistor and a PNP transistor having a base, emitter and collector, said base of said PNP transistor being connected to a juncture between said resistor and said capacitor of said second integrator circuit, said emitter of said PNP transistor being connected to said juncture between said resistor and said capacitor of said first integrator circuit, and said collector of said PNP transistor being connected to said resistor of said discharge circuit, a time constant of said first integrator circuit being higher than that of said second integrator circuit, so that when a voltage at said juncture of said first integrator circuit becomes higher than that at said juncture of said second integrator circuit, said PNP transistor becomes conductive so as to discharge the charge on said capacitor of said first integrator circuit.

* * * * *